US012652637B2

(12) United States Patent
Sethi et al.

(10) Patent No.: US 12,652,637 B2
(45) Date of Patent: Jun. 9, 2026

(54) ONBOARDING AND REMOTE PROVISING FOR STANDALONE NON-PUBLIC NETWORK (SNPN)

(71) Applicant: InterDigital Patent Holdings, Inc., Wilmington, DE (US)

(72) Inventors: Anuj Sethi, Ottawa (CA); Behrouz Aghili, Commack, NY (US); Guanzhou Wang, Brossard (CA); Samir Ferdi, Kirkland (CA); Taimoor Abbas, Sainte-Julie (CA); Ulises Olvera-Hernandez, Saint-Lazare (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 320 days.

(21) Appl. No.: 18/681,242

(22) PCT Filed: Jul. 27, 2022

(86) PCT No.: PCT/US2022/038563
§ 371 (c)(1),
(2) Date: Feb. 5, 2024

(87) PCT Pub. No.: WO2023/014559
PCT Pub. Date: Feb. 9, 2023

(65) Prior Publication Data
US 2024/0314720 A1     Sep. 19, 2024

Related U.S. Application Data

(60) Provisional application No. 63/230,418, filed on Aug. 6, 2021.

(51) Int. Cl.
H04W 60/04     (2009.01)
H04W 12/30     (2021.01)

(52) U.S. Cl.
CPC ........... H04W 60/04 (2013.01); H04W 12/35 (2021.01)

(58) Field of Classification Search
CPC ..... H04W 60/04; H04W 60/00; H04W 12/06; H04W 12/30; H04W 12/35; H04W 8/24
See application file for complete search history.

(56) References Cited

U.S. PATENT DOCUMENTS 10,652,735 B2 *     5/2020     Li ........................... G08B 5/222
10,779,254 B2 *     9/2020     Lee ........................ H04W 28/10
(Continued)

FOREIGN PATENT DOCUMENTS

WO     WO-2021146685 A1 *     7/2021     ............ H04W 76/10
WO     WO-2021204369 A1 *     10/2021     ............ H04W 60/00
(Continued)

OTHER PUBLICATIONS

3rd Generation Partnership Project, S2-2007535, "KI #4, Sol #5: Update to clarify how the UE discovers and selects the onboarding network", Samsung SA WG2 Meeting #141E Electronic, Elbonia, Oct. 12-Oct. 23, 2020, 9 pages.
(Continued)

*Primary Examiner* — Hai V Nguyen
(74) *Attorney, Agent, or Firm* — Flaster Greenberg P.C.

(57)     ABSTRACT

A user equipment, WTRU (401), may be provisioned on a stand-alone non-public network, SNPN. The WTRU registers with an on-boarding network, ONN (402). An indication that the WTRU is requesting to register with the ONN is received by a provisioning server, PVS (403), of the SNPN. An identifier associated with the WTRU is transmitted to the PVS. The PVS requests to subscribe to notifications related to the provisioning. For example, the notifications are sent/received via a network exposure function, NEF. A notification that the WTRU has successfully registered with the
(Continued)

SNPN is transmitted (e.g., to the devices the requested to subscription notifications). After the WTRU has been successfully registered, the WTRU is de-registered from the ONN, and an indication that the WTRU has been de-registered from the ONN is transmitted (e.g., via the NEF).

16 Claims, 12 Drawing Sheets

(56) References Cited

U.S. PATENT DOCUMENTS

| | | | | |
|---|---|---|---|---|
| 11,445,401 | B2 * | 9/2022 | Huang-Fu | H04W 76/22 |
| 11,606,743 | B2 * | 3/2023 | Kakinada | H04W 12/086 |
| 11,711,757 | B2 * | 7/2023 | Liao | H04W 48/18 |
| | | | | 370/329 |
| 11,812,258 | B2 * | 11/2023 | Li | H04W 8/205 |
| 11,943,698 | B2 * | 3/2024 | Baek | H04W 48/18 |
| 12,069,754 | B2 * | 8/2024 | Bangolae | H04W 76/14 |
| 12,143,463 | B2 * | 11/2024 | Sung | H04L 67/61 |
| 12,156,175 | B2 * | 11/2024 | Kweon | H04W 60/04 |
| 12,225,491 | B2 * | 2/2025 | Kweon | H04W 76/10 |
| 12,231,996 | B2 * | 2/2025 | Adjakple | H04W 4/40 |
| 12,245,134 | B2 * | 3/2025 | Starsinic | H04W 48/12 |
| 12,302,234 | B2 * | 5/2025 | Merwaday | H04W 48/18 |
| 12,309,736 | B2 * | 5/2025 | Youn | H04W 60/005 |
| 12,477,334 | B2 * | 11/2025 | Lehtovirta | H04W 4/50 |
| 2018/0338241 | A1 * | 11/2018 | Li | H04W 4/40 |
| 2020/0344602 | A1 * | 10/2020 | Li | H04L 67/125 |
| 2021/0058784 | A1 * | 2/2021 | Kedalagudde | H04W 76/12 |
| 2022/0086218 | A1 * | 3/2022 | Sabella | H04M 15/66 |
| 2022/0159751 | A1 * | 5/2022 | Bangolae | H04W 4/40 |
| 2022/0191733 | A1 * | 6/2022 | Ali | H04L 41/0806 |
| 2022/0248296 | A1 * | 8/2022 | Merwaday | H04W 48/18 |
| 2022/0321674 | A1 * | 10/2022 | Sung | H04L 67/52 |
| 2022/0394668 | A1 * | 12/2022 | Kweon | H04W 60/00 |
| 2023/0043899 | A1 * | 2/2023 | Kweon | H04W 76/12 |
| 2023/0045765 | A1 * | 2/2023 | Youn | H04W 60/005 |
| 2023/0048624 | A1 * | 2/2023 | Balasubramanian | |
| | | | | H04W 12/76 |
| 2023/0099786 | A1 * | 3/2023 | Xiang | H04W 12/75 |
| | | | | 370/329 |
| 2023/0164194 | A1 * | 5/2023 | Foti | H04W 8/205 |
| | | | | 370/329 |

| | | | | |
|---|---|---|---|---|
| 2023/0189187 | A1 * | 6/2023 | Velev | H04W 48/16 |
| | | | | 455/435.1 |
| 2023/0189192 | A1 * | 6/2023 | Talebi Fard | H04W 12/088 |
| | | | | 726/4 |
| 2023/0199632 | A1 * | 6/2023 | Talebi | H04W 48/10 |
| | | | | 455/434 |
| 2023/0413049 | A1 * | 12/2023 | Wang | H04L 67/14 |
| 2024/0064129 | A1 * | 2/2024 | Ben Henda | H04L 63/0428 |
| 2024/0073691 | A1 * | 2/2024 | Lehtovirta | H04W 12/106 |
| 2024/0098500 | A1 * | 3/2024 | Pateromichelakis | H04W 12/35 |
| 2024/0121572 | A1 * | 4/2024 | Ramachandran | H04W 4/021 |
| 2024/0155419 | A1 * | 5/2024 | Di Girolamo | H04W 28/0268 |
| 2024/0155532 | A1 * | 5/2024 | Wang | H04W 12/06 |
| 2024/0381239 | A1 * | 11/2024 | Wang | H04W 48/16 |
| 2025/0016041 | A1 * | 1/2025 | Wang | H04L 41/0661 |
| 2025/0031169 | A1 * | 1/2025 | Sethi | H04W 48/20 |
| 2025/0150789 | A1 * | 5/2025 | Adjakple | H04W 4/80 |
| 2025/0310777 | A1 * | 10/2025 | Baskaran | H04W 12/35 |
| 2025/0338342 | A1 * | 10/2025 | Olvera-Hernandez | |
| | | | | H04W 48/20 |

FOREIGN PATENT DOCUMENTS

| | | | | |
|---|---|---|---|---|
| WO | WO-2021205339 A1 * | 10/2021 | | H04L 41/0806 |
| WO | WO-2021236917 A2 * | 11/2021 | | H04W 48/18 |
| WO | WO-2022233426 A1 * | 11/2022 | | H04W 28/0263 |
| WO | WO-2023018035 A1 * | 2/2023 | | H04W 60/04 |

OTHER PUBLICATIONS

3rd Generation Partnership Project, "KI #4, Sol #5: Update to clarify how the UE discovers and selects the onboarding network", Samsung, S2-2007851, SA WG2 Meeting #141E, Oct. 12-Oct. 23, 2020, Electronic, Elbonia, 9 pages.

3rd Generation Partnership Project, "Study on Enhanced Support of Non-Public Networks (NPN) (Release 17)", Technical Specification Group Services and System Aspects, 3GPP TR 23.700-07 V17.0.0, Mar. 2021, 248 pages.

3rd Generation Partnership Project, "System architecture for the 5G System (5GS)"; Stage 2, (Release 17), 3GPP TS 23.501 V17.1.1, Jun. 2021, 526 pages.

3rd Generation Partnership Project, "Technical Specification Group Services and System Aspects; Procedures for the 5G System (5GS); Stage 2 (Release 17)", 3GPP TS 23.502 V17.1.0, Jun. 2021, 692 pages.

* cited by examiner

ONBOARDING AND REMOTE PROVISING FOR STANDALONE NON-PUBLIC NETWORK (SNPN)

CROSS REFERENCE TO RELATED APPLICATIONS

This application is the 371 National Stage of International Application No. PCT/US2022/038563, filed Jul. 27, 2022, which claims the benefit of U.S. Provisional Patent Application No. 63/230,418, filed Aug. 6, 2021, which is hereby incorporated by reference in its entirety.

BACKGROUND

An onboarding network (ONN) in a communication system, such as a 5G communication system, may restrict network usage for onboarding services, and an onboarding WTRU may be de-registered after finishing remote provisioning. Deregistration may be either triggered by the onboarding WTRU or the access and mobility management function (AMF) of the ONN. For example, in certain implementations, the AMF may deregister the onboarding WRT upon expiration of a timer. The timer may, however, expire before the WTRU has successfully completed onboarding. Also, or alternatively, the timer may expire after the WTRU has been onboarded.

SUMMARY

Techniques for provisioning a wireless transmit receive unity (WTRU) on a stand-alone non-public network (SNPN) are described herein. An indication that the WTRU is requesting to register with an onboarding network (ONN) in order to request credentials for the SNPN (e.g., be provisioned with the SNPN) may be received. The indication that the WTRU is requesting to register with the ONN may be sent/received in response to the WTRU transmitting a physical data unit (PDU) session establishment request (e.g., a restricted PDU session establishment request). For example, the indication that the WTRU is requesting to register with the ONN may be received by a device associated with the SNPN, e.g., a provisioning server (PVS) and/or a network node associated with the ONN (e.g., a function associated with the ONN, such as an application management function (AMF), a session management function (SMF), etc.). An identifier associated with the WTRU (e.g., a generic public subscription identifier (GPSI)) may be transmitted to the PVS associated with the SNPN. A request to subscribe to one or more notifications related to the WTRU provisioning with the SNPN may be sent. For example, the notifications related to the WTRU provisioning with the SNPN may be sent/received via a network exposure function (NEF). For example, the request to subscribe to the notifications related to the WTRU provisioning with the SNPN may be sent by the PVS and/or the AMF/SMF associated with the ONN. In response to the request to subscribe the notifications, a notification that the WTRU has successfully provisioned with the SNPN may be transmitted (e.g., to the devices the requested to subscribe to notifications related to the WTRU provisioning with the SNPN). For example, successful registration may include the WTRU being provisioned with credentials to access the SNPN. After the WTRU has been successfully provisioned, the WTRU may be de-registered from the ONN, and an indication that the WTRU has been de-registered from the ONN may be transmitted (e.g., to the devices the requested to subscribe to notifications related to the WTRU provisioning with the SNPN). After being provisioned with credentials to access the SNPN, the WTRU may initiate a selection procedure with SNPN, for example, using the received credentials for accessing the SNPN.

DETAILED DESCRIPTION

Figure 1A:
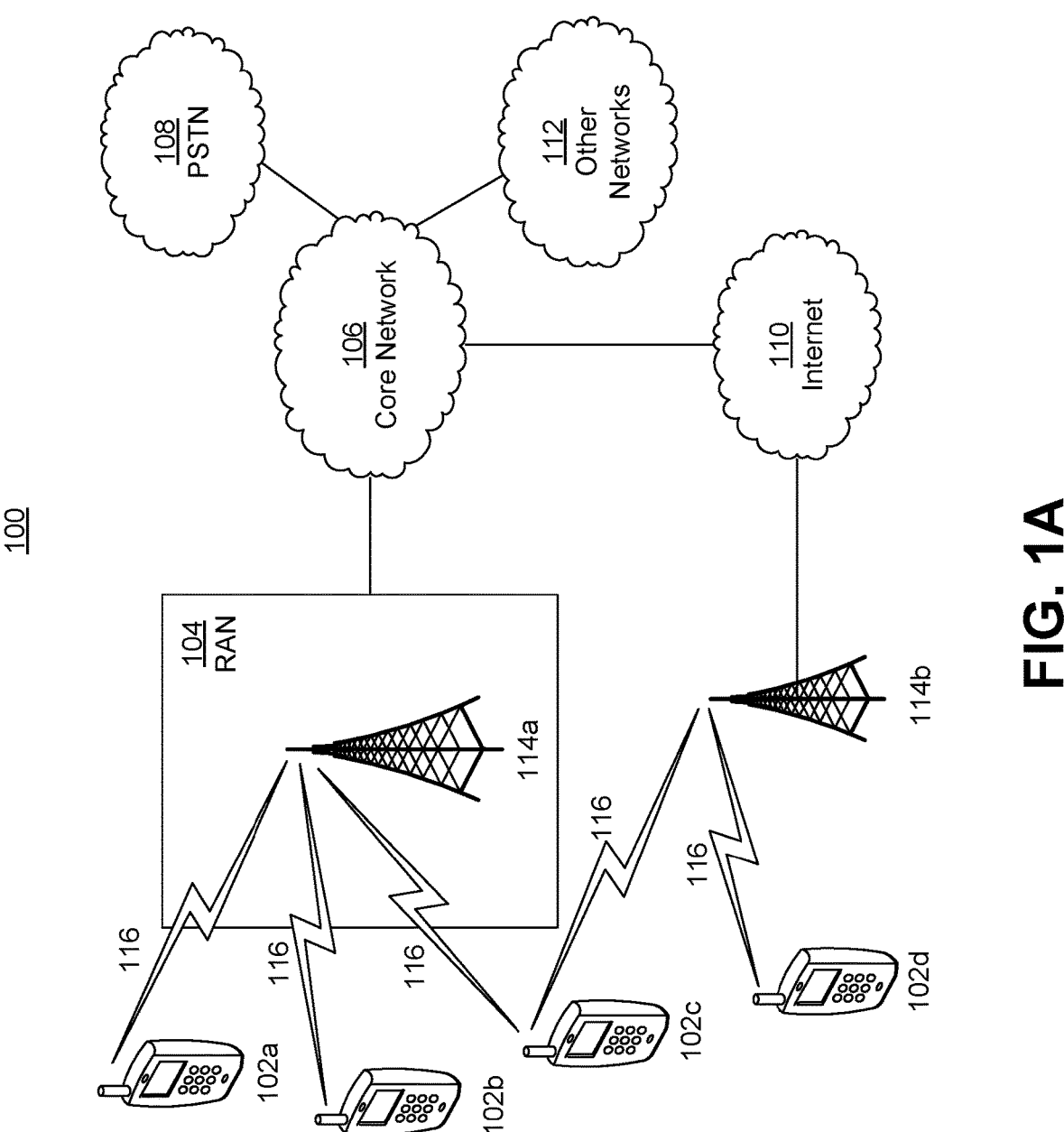
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
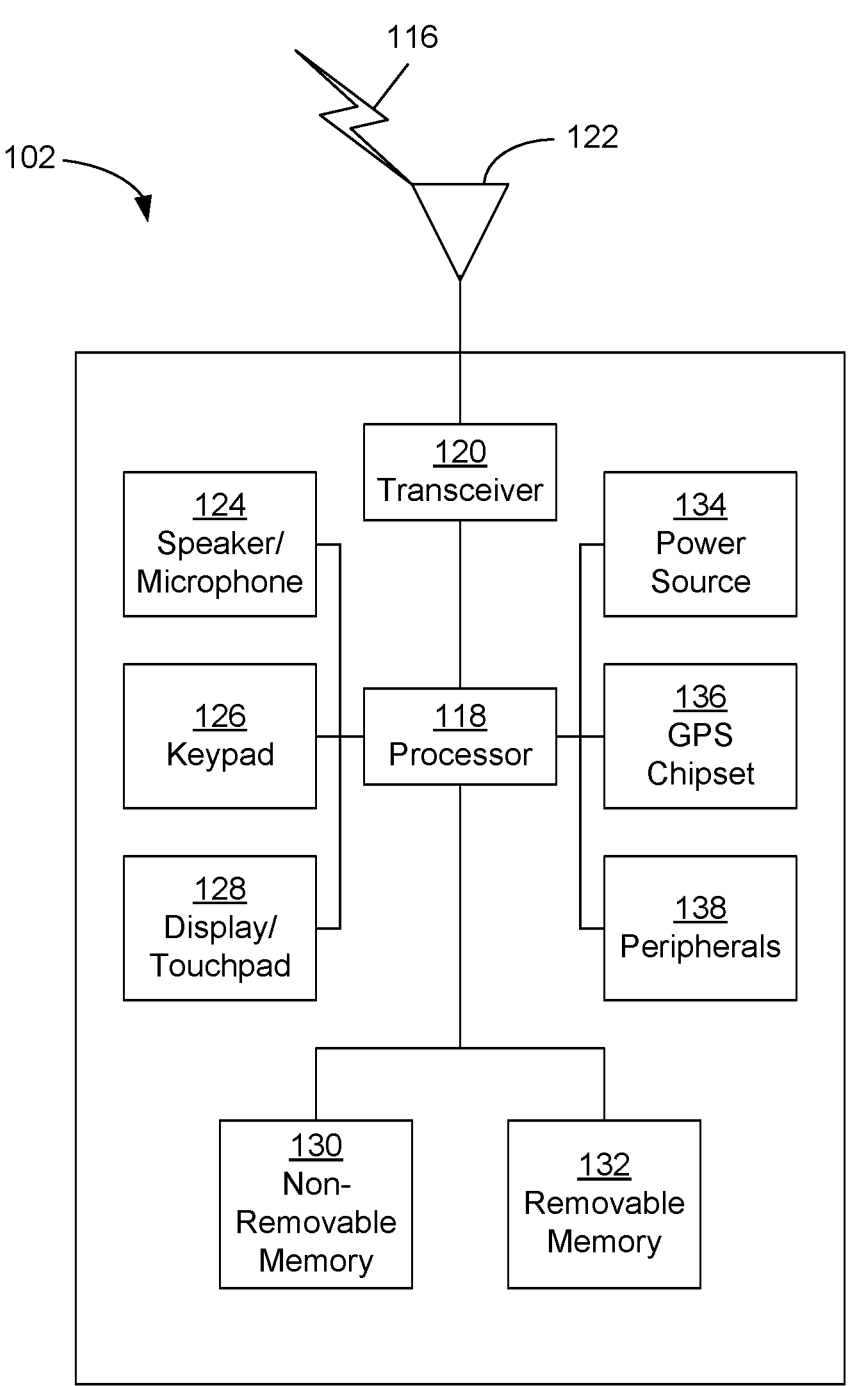
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception).

Figure 1C:
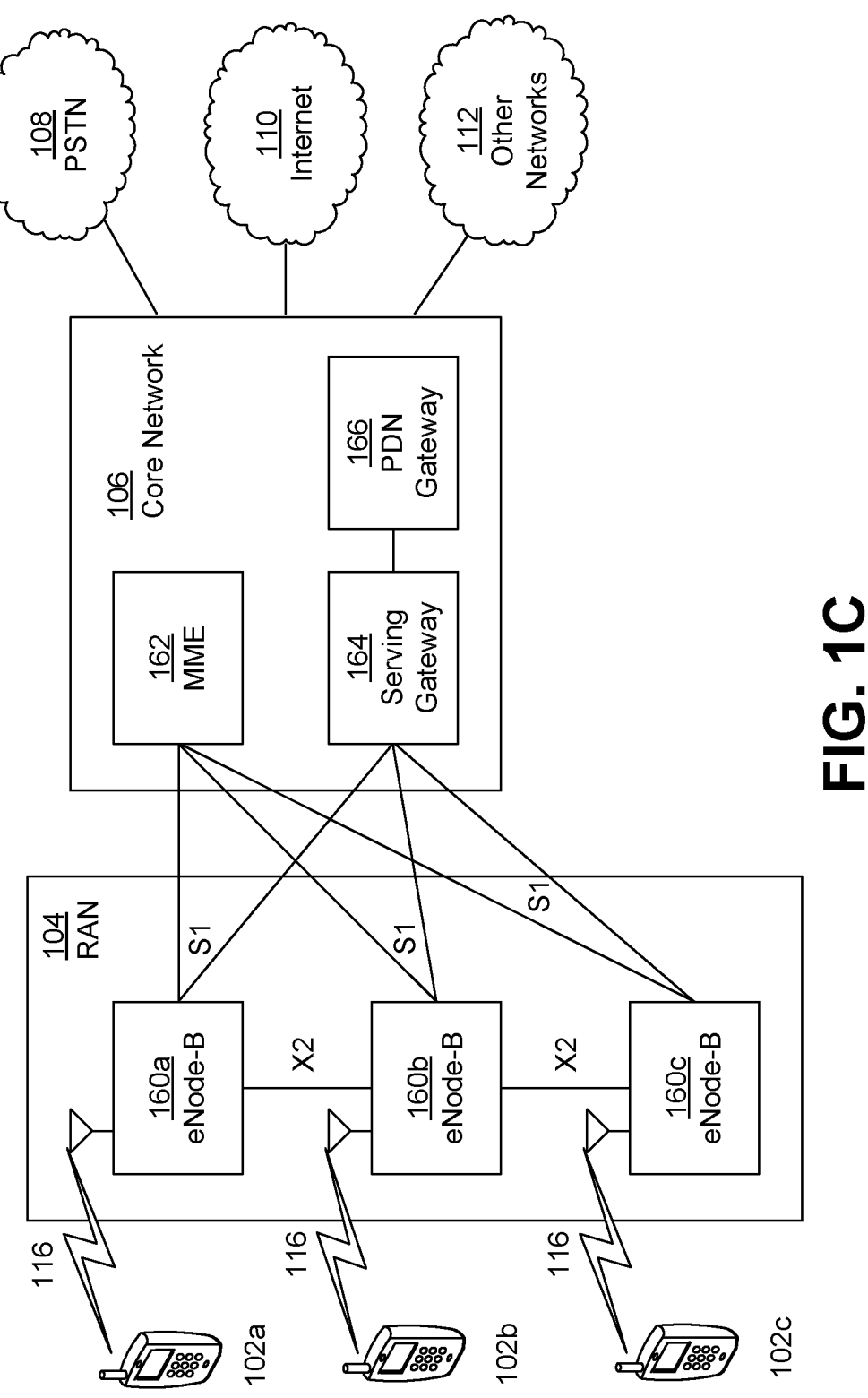
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
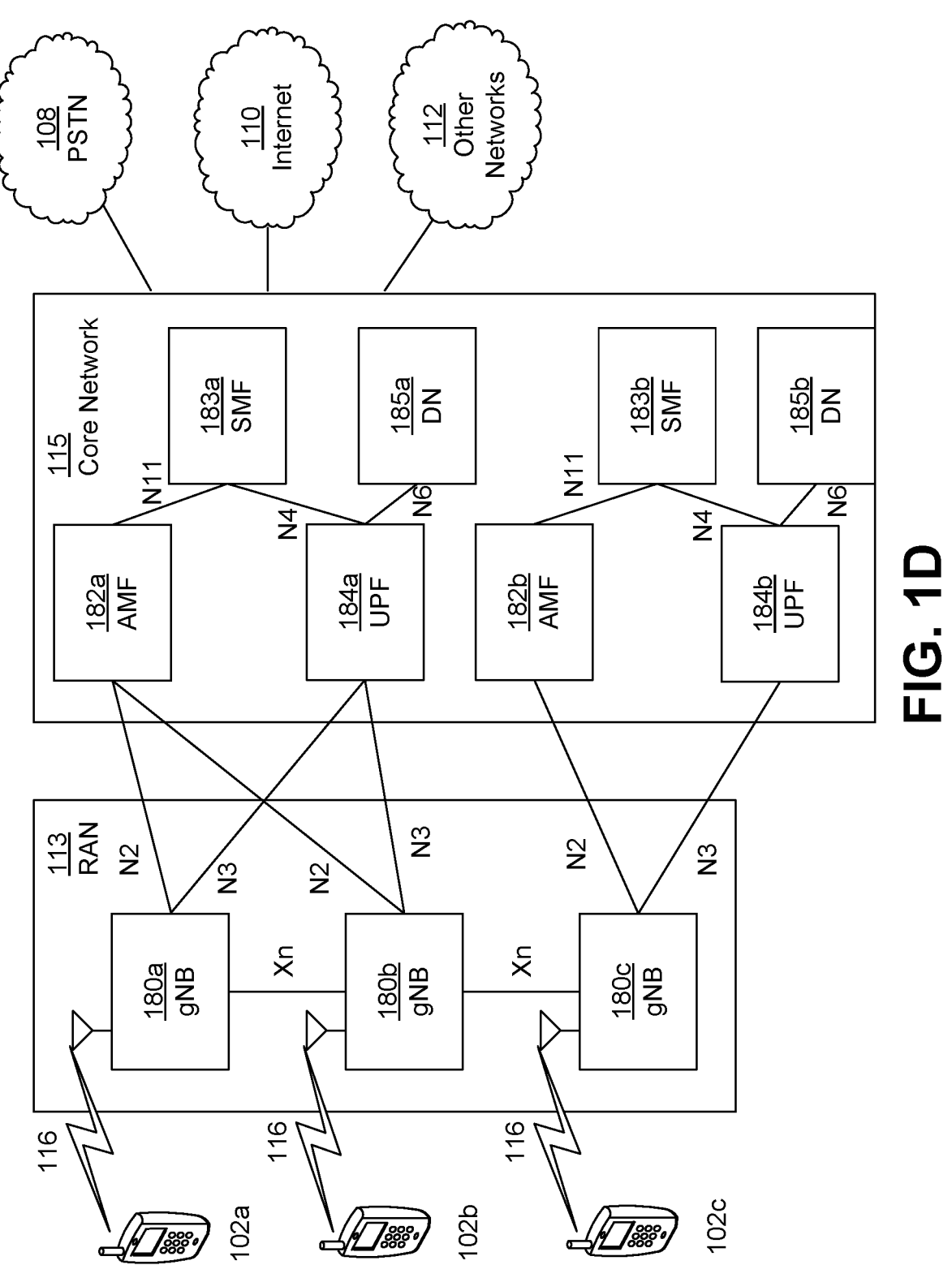
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The techniques describe herein relate to the onboarding and/or provisioning a device, such as a WTRU (e.g., an onboarding WTRU), with a non-public network (NPN), e.g., a standalone NPN (SNPN). For example, the device may be onboarded/provisioned with SNPN (e.g., provisioned with credentials to access the SNPN) using an onboarding network (ONN).

A WTRU may be onboarded/provisioned to an SNPN. For example, WTRUs may be onboarded to an SNPN via an ONN, e.g., based on default WTRU credentials. A WTRU may access/register with the ONN to obtain (e.g., be provisioned with) credentials (e.g., credentials for authenticating with the SNPN) and/or other information to enable the WTRU to access a desired SNPN, e.g., (re-)select and (re-)provision with SNPN. In order to provision a WTRU with credentials to access an SNPN, the WTRU may select a desired SNPN to access and/or an associated ONN. The WTRU may, for example, using default credentials, establish a secure connection with that SNPN via the ONN, which may also be referred to herein referred to as onboarding SNPN (ON-SNPN). After a secure connection is established, the WTRU may be provisioned with SNPN credentials and other data to enable discovery, (re-)selection and (re-)registration with the desired SNPN. In certain scenarios, the ON-SNPN and/or the SNPN may both be associated with the same network (e.g., with respect to a specific WTRU).

Figure 2:
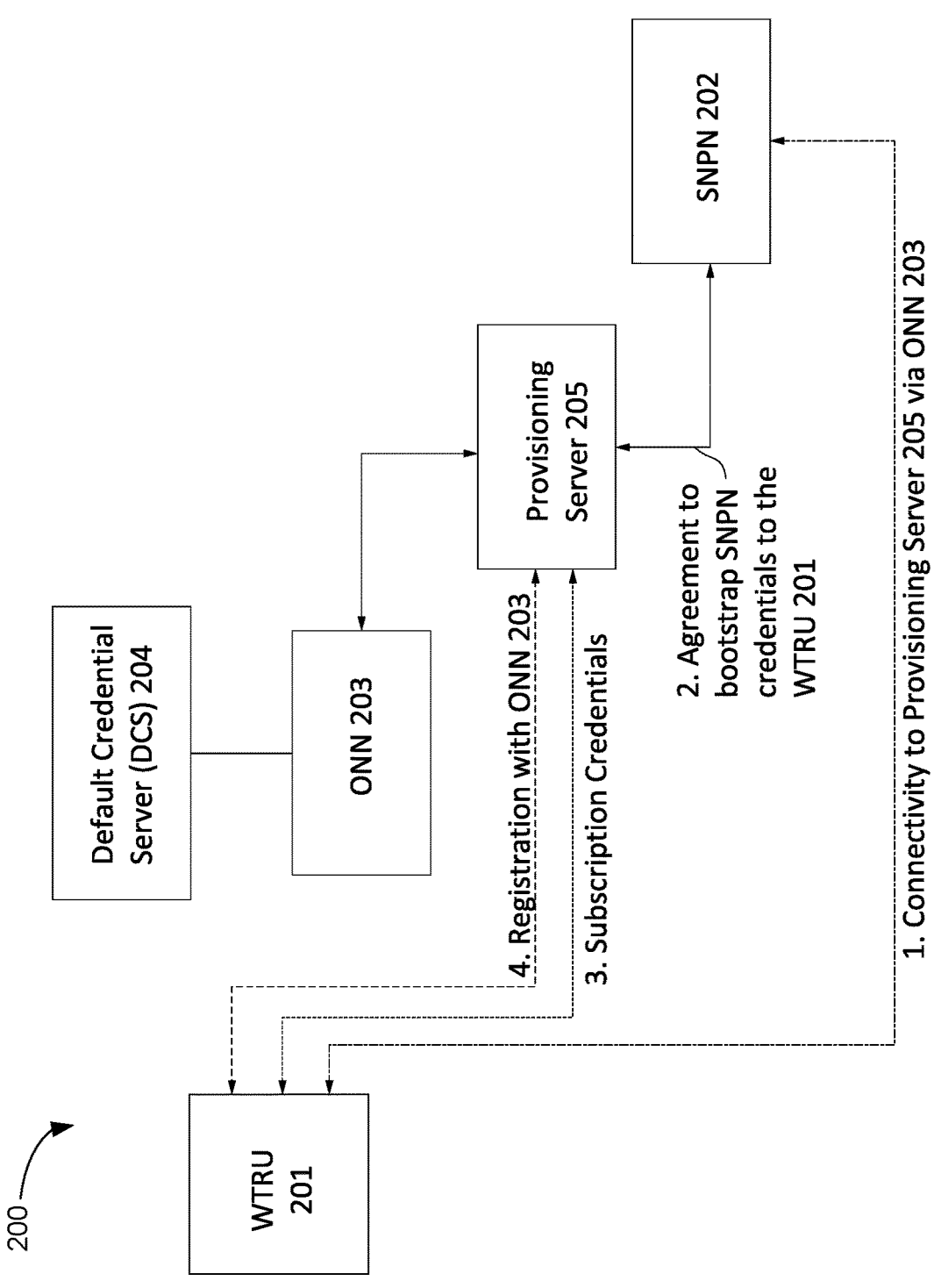
FIG. 2 is a diagram illustrating an example WTRU onboarding and provisioning associated with Standalone Non Public Network (SNPN)

FIG. 2 is a diagram 200 associated with a WTRU 201 onboarding/provisioning with an SNPN 202. One or more of the following may apply. As shown in FIG. 2, the WTRU 201 may register with an ONN 203. During registration, the WTRU 201 may be provisioned with one or more of the following: credentials (e.g., default WTRU credentials), an identifier associated with the WTRU 201 (e.g., a unique WTRU identifier), and/or an identifier associated with an onboarding group. The WTRU 201 may select the SNPN 203, e.g., based on the information broadcasted by the SNPN 203. The WTRU 201 may trigger registration with the SNPN 202 via the SNPN 203. For example, a registration type associated with the triggered registration may include, for example, "SNPN onboarding."

The SNPN 203 may have access to a default credential server (DCS) 204. For example, the DCS 204 may be used to verify that WTRU 201 is subject to onboarding, e.g., based on the identifier associated with the WTRU and/or the associated default WTRU credentials. In certain implementations, the DCS 204 may be used for 5GS-level WTRU authentication/authorization during registration to SNPN 203, e.g., for onboarding purpose.

The WTRU 201 may derive and/or provide one or more identifiers based on the credentials associated with the WTRU 201. For example, the WTRU 201 may provide a subscription concealed identifier (SUCI), which may be derived from a subscription permanent identifier (SUPI). The SUPI may identify, e.g., uniquely identify, the WTRU 201 and may be derived from the credentials associated with the WTRU 201.

Once the WTRU 201 has been successfully authenticated by the SNPN 202, the SNPN 202 may provide the WTRU 201 with connectivity, e.g., by establishing a configuration PDU session with a provisioning server (PVS) 205. The PVS 205 may communicate with the SNPN 202 and/or may have access to credentials (e.g., subscription credentials) associated with the WTRU 201's subscription which are provisioned by the PVS using the WTRU onboarding procedure. For example, the PVS may allow the WTRU 201 to retrieve their subscription credentials and/or configuration data. The WTRU 201 may use the subscription credentials and/or the configured data to provision with the SNPN 202. Upon a successful provisioning, the WTRU 201 may releases the configuration PDU session and deregisters from the ONN 203. The WTRU 201 may then perform SNPN selection and register to the appropriate SNPN (e.g., SNPN 202) as per the received configuration and/or using SNPN selection procedures.

In certain scenarios, an ONN may restrict the usage for onboarding services, and an onboarding WTRU may be de-registered, for example, upon completion of remote provisioning. For example, de-registration of the WTRU on the ONN may be triggered by the WTRU and/or the ONN (e.g., the AMF of the ONN). AMF may start a timer, and the time may be used to monitor the onboarding process of an onboarding WTRU and/or the successful completion of onboarding the WTRU to an SNPN. Upon expiration of the timer, the ONN (e.g., via the AMF) may deregister the onboarding WTRU from the ONN (e.g., trigger a network initiated de-registration procedure with the WTRU to de-register the WTRU from the ONN. The WTRU may be provisions (e.g., remotely provision) with credentials for accessing the SNPN (e.g., SNPN credentials). For example, the WTRU may be provisioned with the SNPN credential over the control plane (CP) and/or the user plane (UP). If, for example, the WTRU is provisioned with SNPN credentials using the CP, the AMF may be aware of the progress of the WTRU's provisioning procedure. If, however, the WTRU is provisioned with SNPN credentials using the UP, AMF may not be aware of the progress of the WTRU's provisioning procedure.

As described herein, the AMF may not be aware of the status of an ongoing UP remote provisioning for a WTRU. If the AMF is not aware of the status of a WTRU's remote provision for an SNPN, the AMF may hold onto network resources after or after the WTRU has been successfully provision. For example, in such scenarios the WTRU may be deregistered from the ONN upon expiration of a timer running at the AMF. However, as the AMF and the timer are not aware of the status of the WTRU's provision procedure, the WTRU may be prematurely deregister from the ONN (e.g., prior to the completion of the WTRU's remote provisioning). Also, or alternatively, the WTRU may continue to be registered with the ONN after completion of the WTRU's remote provisioning, which may unnecessarily constrain network resources.

One or more techniques described herein may provide for interaction/communication between external application functions (AF) (e.g., a PVS associated with an SNPN) and core network (CN) functions (e.g., 5GCN functions, such as an AMF/SMF). For example, techniques for provisioning a WTRU on a SNPN may be provided. An indication that the WTRU is requesting to register with an ONN in order to request credentials for the SNPN may be received. The indication that the WTRU is requesting to register with the ONN may be sent/received in response to the WTRU transmitting a physical data unit (PDU) session establishment request (e.g., a restricted PDU session establishment request). For example, the indication that the WTRU is requesting to register with the ONN may be received by a device associated with the SNPN (e.g., a PVS) and/or a network node associated with the ONN (e.g., a function associated with the ONN, such as an AMF, an SMF, etc.). An identifier associated with the WTRU (e.g., a GPSI) may be transmitted to the PVS associated with the SNPN. A request to subscribe to one or more notifications related to the WTRU provisioning with the SNPN may be sent. For example, the notifications related to the WTRU provisioning with the SNPN may be sent/received via a network exposure function (NEF). For example, the request to subscribe to the notifications related to the WTRU provisioning with the SNPN may be sent by the PVS and/or the AMF/SMF associated with the ONN. In response to the request to subscribe the notifications, a notification that the WTRU has successfully been provisioned with the SNPN may be transmitted (e.g., to the devices the requested to subscribe to notifications related to the WTRU provisioning with the SNPN). For example, successful registration may include the WTRU being provisioned with credentials to access the SNPN. After the WTRU has been successfully provisioned, the WTRU may be de-registered from the ONN, and an indication that the WTRU has been de-registered from the ONN may be transmitted (e.g., to the devices the requested to subscribe to notifications related to the WTRU provisioning with the SNPN). After being provisioned with credentials to access the SNPN, the WTRU may initiate a selection procedure with SNPN, for example, using the received credentials for accessing the SNPN.

A model (e.g., a publish-subscribe model) for interactions, communications, and/or notifications between an external AF (e.g., carrying out a remote provisioning for an onboarding WRTU) and a core network function (e.g., AMF/SMF). The model may be used, for example, by the network, to receive updates associated with the external AF and/or to trigger events (e.g., in response to the received updates).

A core network function may expose its functionalities (e.g., via one or more APIs) to the external AF, for example, via a network exposure function (NEF), to an external AF and/or a PVS associated with an SNPN. As described herein, external AF may also be referred to as AF. The AF may use the exposed core network function APIs to provide updates (e.g., status updates on the progress of an ongoing remote provisioning), issue commands, etc. Once remote provisioning is successful, the AF may use the functional APIs to inform the core network (e.g., core network functions, such as AMF) about the successful completion of the provisioning, which may enable the core network function to trigger a de-registration procedure with the WTRU (e.g., a network initiated de-registration procedure with the WTRU). This timely exchange of information may enable the core network (e.g., AMF) to release network resources for WTRUs which have been successfully provisioned on an SNPN.

Figure 3:
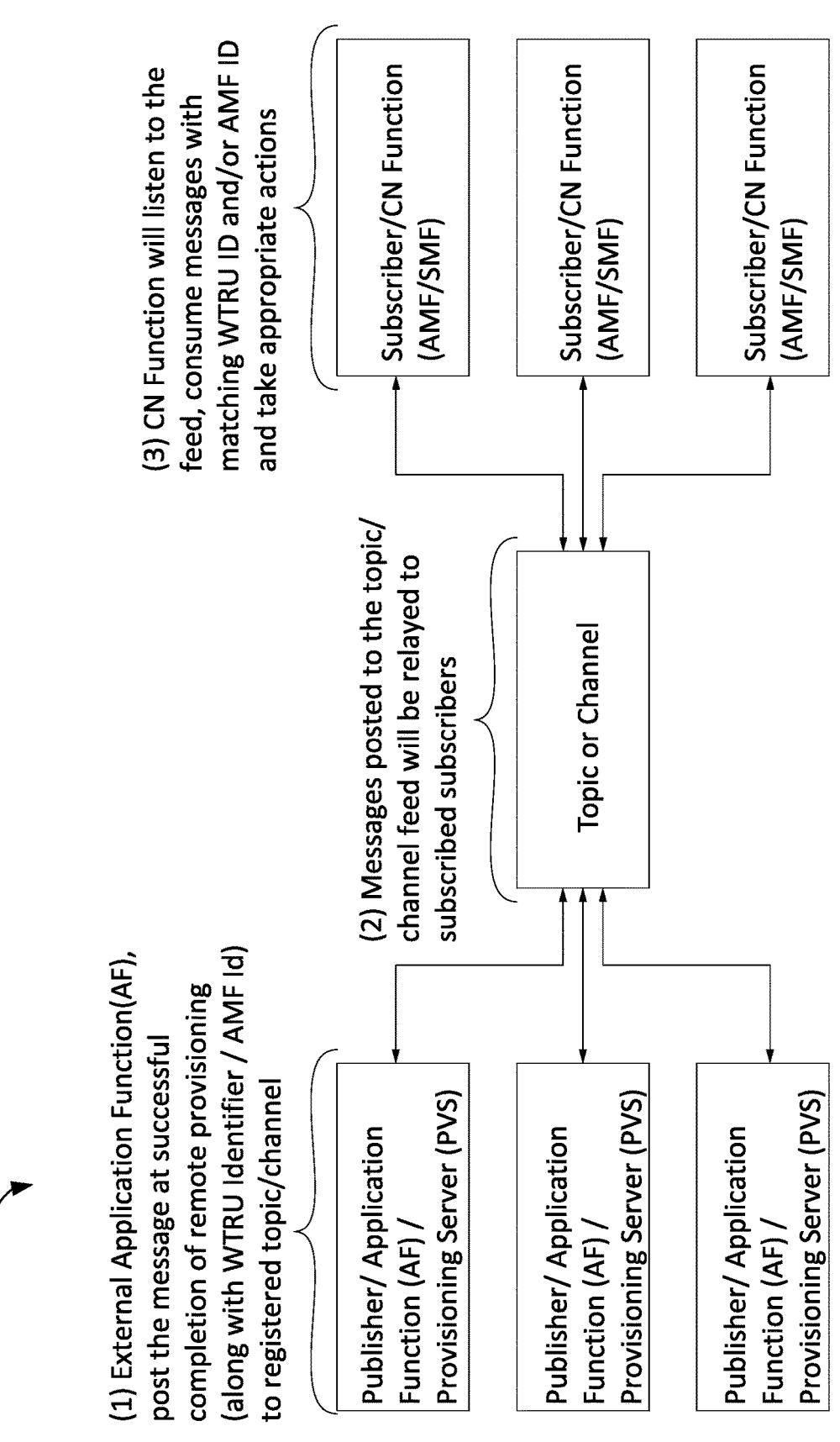
FIG. 3 is a diagram illustrating an example of a publish-subscribe model for interactions between the external application functions and core network functions.

FIG. 3 illustrates an example associated with a model 300 (e.g., a publish-subscribe model). As shown in FIG. 3, the model 300 may be used for interactions, communications, and/or notifications between an external AF (e.g., a PVS associated with an SNPN) and a core network function (e.g., AMF/SMF). For example, the model 300 illustrated in FIG. 3 may be used by a network to receive updates associated with the external AF and/or to trigger events (e.g., in response to the received updates) in the context of a WTRU onboarding to an SNPN. One or more of the following may apply. An external AF may post the message to a registered channel (e.g., status update, successful completion of remote provisioning, etc.). The external AF may also post messages that include identifiers associated with the onboarding WTRU and/or the network node coordinating provisioning Identifiers (GPSI, IP Address/Prefix, AMF ID). As described herein, the network node coordinating provisioning may be a network node of the ONN, (e.g., AMF, SMF, etc.). One or more devices may subscribe to the model, and receive the posted messages. For example, the messages may be posted to the model (e.g., according to a given topic/channel), and the posted messages may then be relayed to the subscribed devices (e.g., the core network functions, such as the AMF and/or the SMF). Based on the posted message, the subscribed devices (e.g., the AMF/SMF associated with the ONN).

Figure 4:
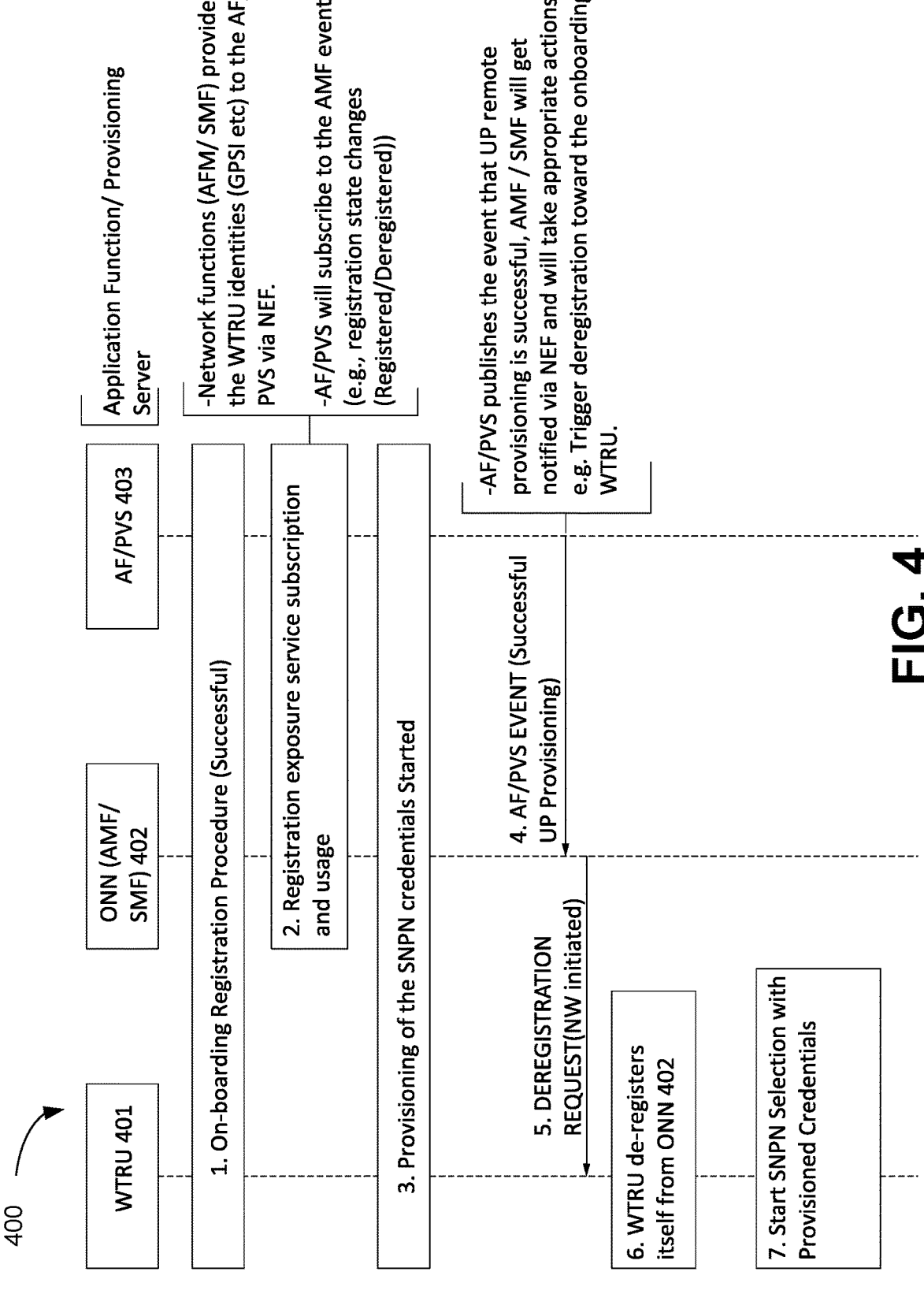
FIG. 4 is a diagram illustrating an example associated with user plane (UP) remote provisioning.

FIG. 4 illustrates and example procedure 400. As shown in FIG. 4, the procedure 400 may be used to provision a WTRU 401 with an SNPN. For example, the WTRU 401 may be provisioned on the SNPN using a PVS 403 via an ONN 402. The WTRU 401 may successfully register with the ONN 402, for example, using an onboarding registration procedure. For example, the onboarding registration procedure may indicate the SNPN with which the WTRU 401 is attempting to be provisioned. After the WTRU 401 has successfully registered with the ONN 402, a network functions associated with the ONN 402 (e.g., AMF/SMF) may provide an identifier associated with the WTRU 401 (e.g., GPSI, etc.) to the PVS 403. For example, the identifier associated with WTRU 401 may be provided to the PVS 403 via an NEF. The PVS 403 and/or the network functions associated with the ONN 402 may subscribe to a model associated with the NEF (e.g., a publish subscribe model to receive updates, interactions, communications, and/or notifications, such as the model 300 shown in FIG. 3). For example, the PVS 403 may subscribe to the model to receive updates associated with registration state changes (e.g., Registered/Deregistered). Also, or alternatively, the network functions of the ONN 402 may subscribe to the model to receive updates associated with the provisioning of the WTRU 401 to the SNPN (e.g., successful provisioning, provisioning ongoing, unsuccessful provisioning, etc.).

After the WTRU 401 successfully registers with the ONN 402, the WTRU 401 may establish a configuration PDU session (e.g., a restricted configuration PDU session). The WTRU may also establish/initiate a remote provisioning procedure (e.g., via the UP). After the PVS 403 determines that WTRU 401 has been successfully provisioned with the SNPN (e.g., the WTRU 401 has been provided credentials to access the SNPN), the PVS may trigger a notification that the WTRU 401 has been successfully provisioned via the NEF. The network functions of the ONN (e.g., AMF/SMF) may receive said notification of successful provisioning, and deregistering the WTRU 401 from the ONN 402. The WTRU 401 may deregister itself from the ONN 402 (e.g., using standard network-initiated deregistration procedures). The WTRU 401 may initiate an SNPN selection procedure using the provisioned credentials (e.g., subscriber owner SNPN (SO-SNPN) credentials).

Figure 5A:
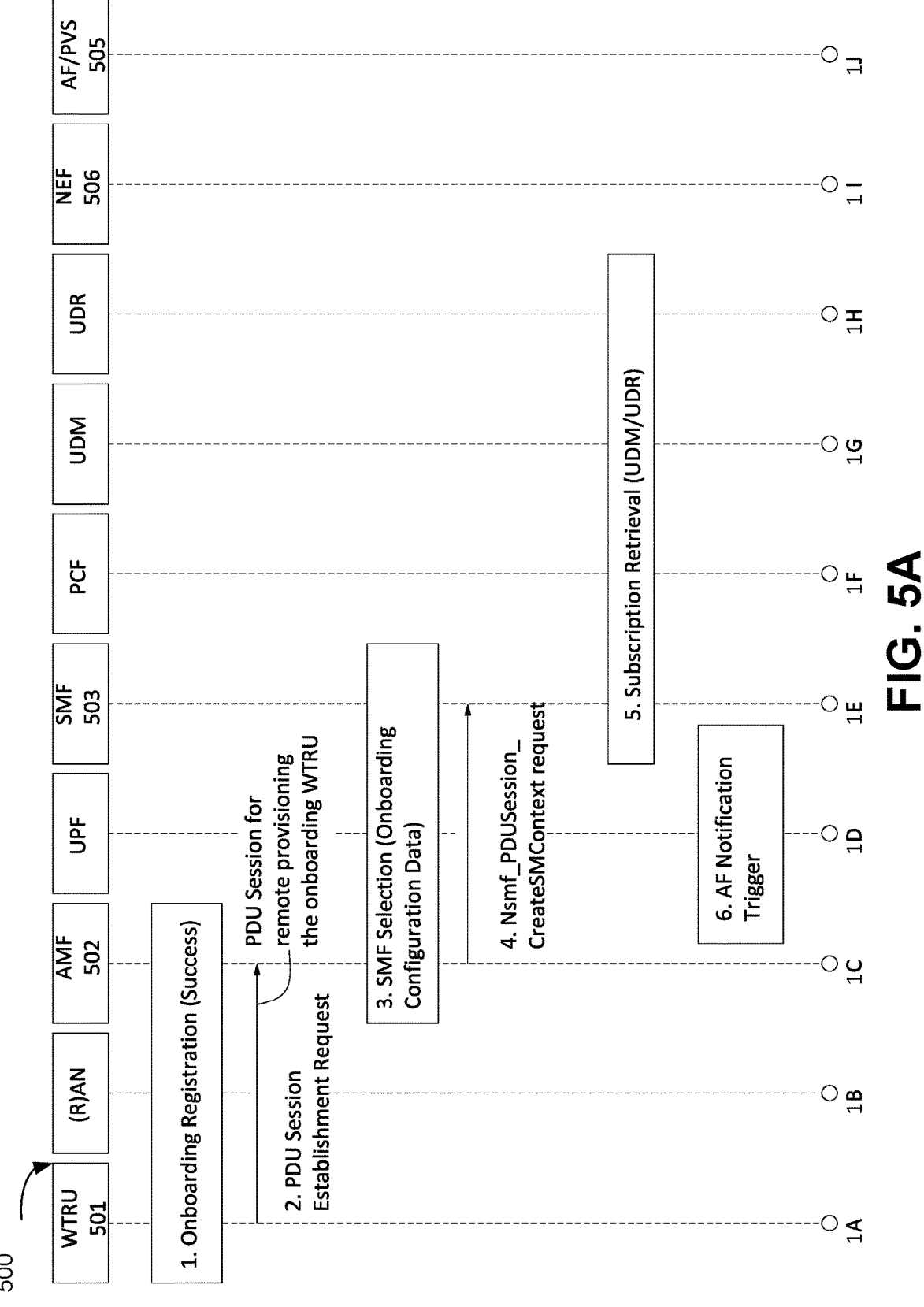
FIGS. 5A-5C illustrate an example flow for an application function and a provisioning server to subscribe itself to the 5G registration exposure service.
Figure 5B:
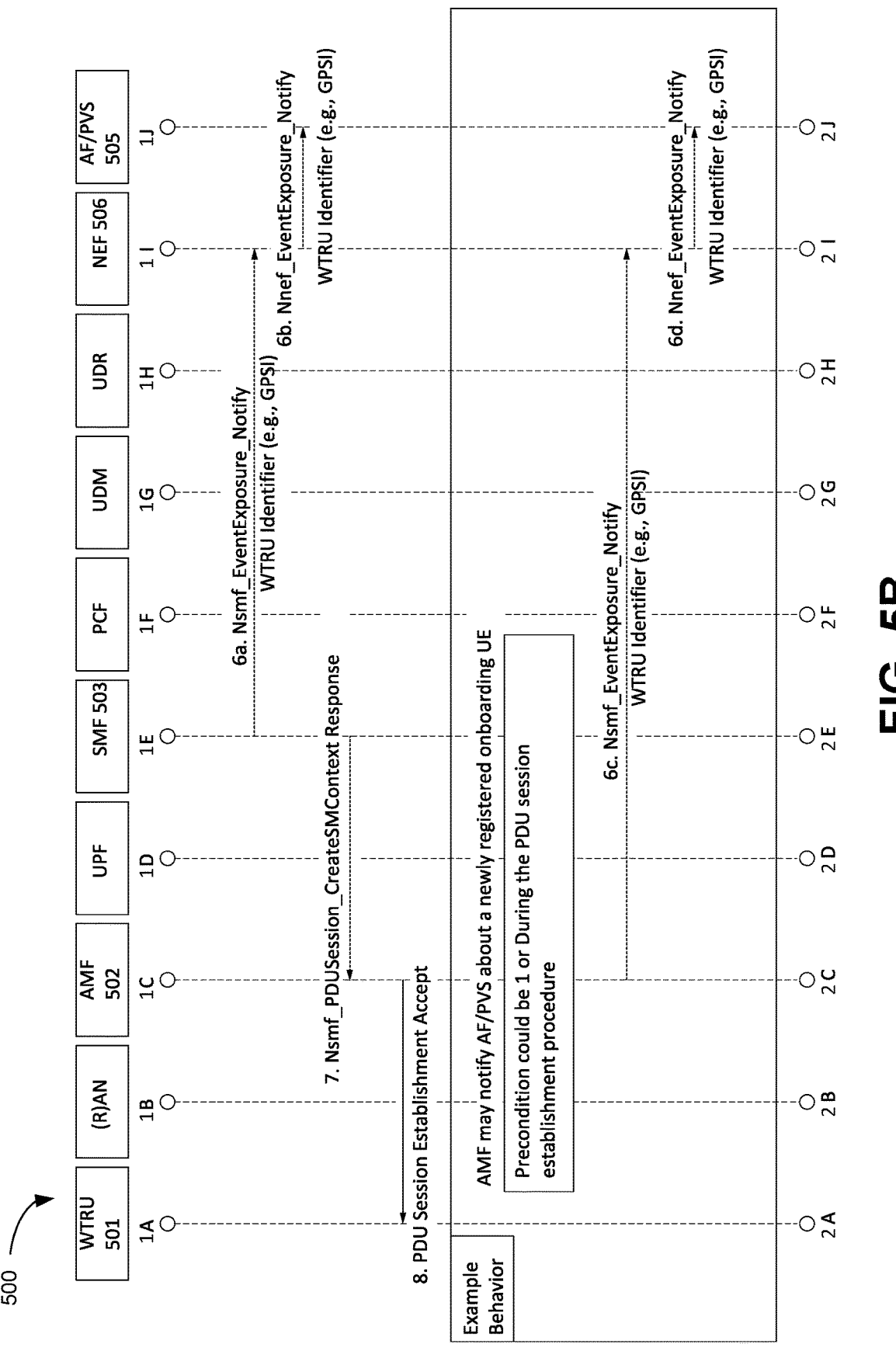
Figure 5C:
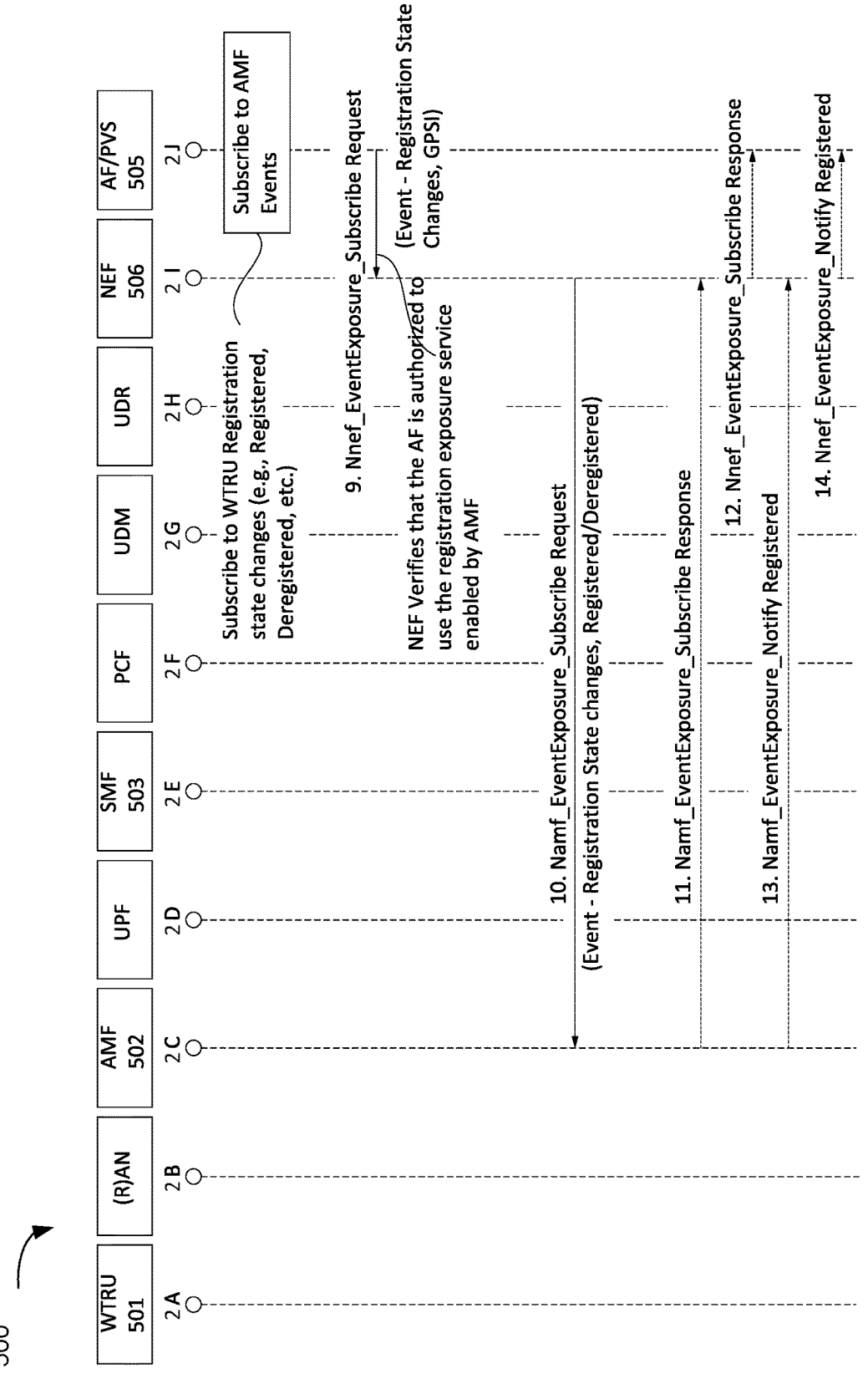

FIGS. 5A-5C illustrates an example procedure 500 associated with provisioning a WTRU 501 with credentials to access an SNPN. As shown in FIG. 5, the procedure 500 illustrates example techniques associated with an external AF/PVS 505 associated with the SNPN using a registration exposure service model (e.g., such as the model 300 of FIG. 3), which may be accessed via an NEF 506. One or more of the following may apply. As shown in FIGS. 5A-5C, the WTRU 501 may register with an ONN (e.g., also referred to herein as an ON-SNPN), for example, to be provisioned with credentials for accessing the SNPN. After successfully registering with an ONN, the WTRU 501 may establish a restricted PDU session, e.g., for the purpose of remote provisioning. An AMF 502 associated with ONN may select an SMF 503 (e.g., using the SMF discovery and selection functionality). For example, the SMF 503 may be used for onboarding service. The AMF 502 may use onboarding configuration data, which may can assist the AMF 502 in SMF selection. The AMF 502 may create a session management (SM) context in the selected SMF 503. The AMF 502 may provide one or more of the following the SMF 503: the PDU session establishment request received from the WTRU 501, the SUPI, the DNN, the S-NSSAI, a PDU session ID, an AMF ID, a PCF ID, a GPSI, and/or the like.

The SMF 503 may retrieve subscription data (e.g., if not already available) from a UDM 504. The AMF 502 and/or the SMF 503 may be aware of the AF/PVS 505 associated with the SNPN. The AMF 502 and/or the SMF 503 may provide certain information associated with the WTRU 501 and/or the provisioning procedure (e.g., an identifier associated with the WTRU 501, a PDU session ID, an AMF ID, etc.) to the AF/PVS 505. For example, the AF/PVS 505 may be used by the PVS 505 to later inform the AMF 502/SMF 503 about the status of the WTRU 501's provisioning (e.g., upon successful completion of the WTRU 501's provisioning). In response to being notified that the WTRU 501 has been successfully provisioned with credentials to access the SNPN, the AMF 502/SMF 503 may trigger one or more notifications toward an NEF and/or the AF/PVS 505. For example, the SMF 503 may notify the NEF 506 and/or the AF/PVS 505 about the identifier associated with the WTRU 501 (e.g. GPSI). Also, or alternatively, after the WTRU has been successfully provisioned one or more notifications may be sent to the AMF 502 and/or the SMF 503, which may cause the WTRU 501 to be de-registered from the ONN. After the WTRU 501 has been successfully provisioned, the WTRU 501 may initiate and/or perform an SNPN selection procedure.

In certain scenarios, the AMF 502 may also, or alternatively, inform the NED and/or AF/PVS 505 of the identifiers associated with the WTRU 501.

In certain scenarios, the AF/PVS 505 may also, or alternatively, subscribe to notification events associated with the WTRU 501 per data network name/single network slice selection assistance information (DNN/S-NSSAI) (e.g., per network slice), which may allow the WTRU 501 to be successfully registered for onboarding and linked per DNN/S-NSSAI. The AF/PVS 505 may be notified about events associated with the WTRU 501 per DNN/S-NSSAI and/or the identifiers associated with the WTRU 501 (e.g. GPSI). One or more of the following may apply. The SM context may be successfully created. A PDU session establishment acceptance message may be sent to the WTRU 501. The AF/PVS 505 may subscribe to events associated with the AMF 502 (e.g., registration state changes, such as registered/deregistered), and a subscription request may be sent to NEF along with the identifier associated with the WTRU 501 (e.g., GPSI or other WTRU identity). The NEF may send a request to subscribe to events at the AMF 502 (e.g., registration state changes), for example, via a Namf_EventExposure_Subscribe request message. Upon successfully receiving Namf_EventExposure_Subscribe response message, the NEF 506 may relay an indication that the Namf_EventExposure_Subscribe response message was received to the AF/PVS 505. The AMF 502 may notify about subscribed event (Registration State changes), WTRU registration state may be registered, NF may relay this status information to AF/PVS.

Figure 6A:
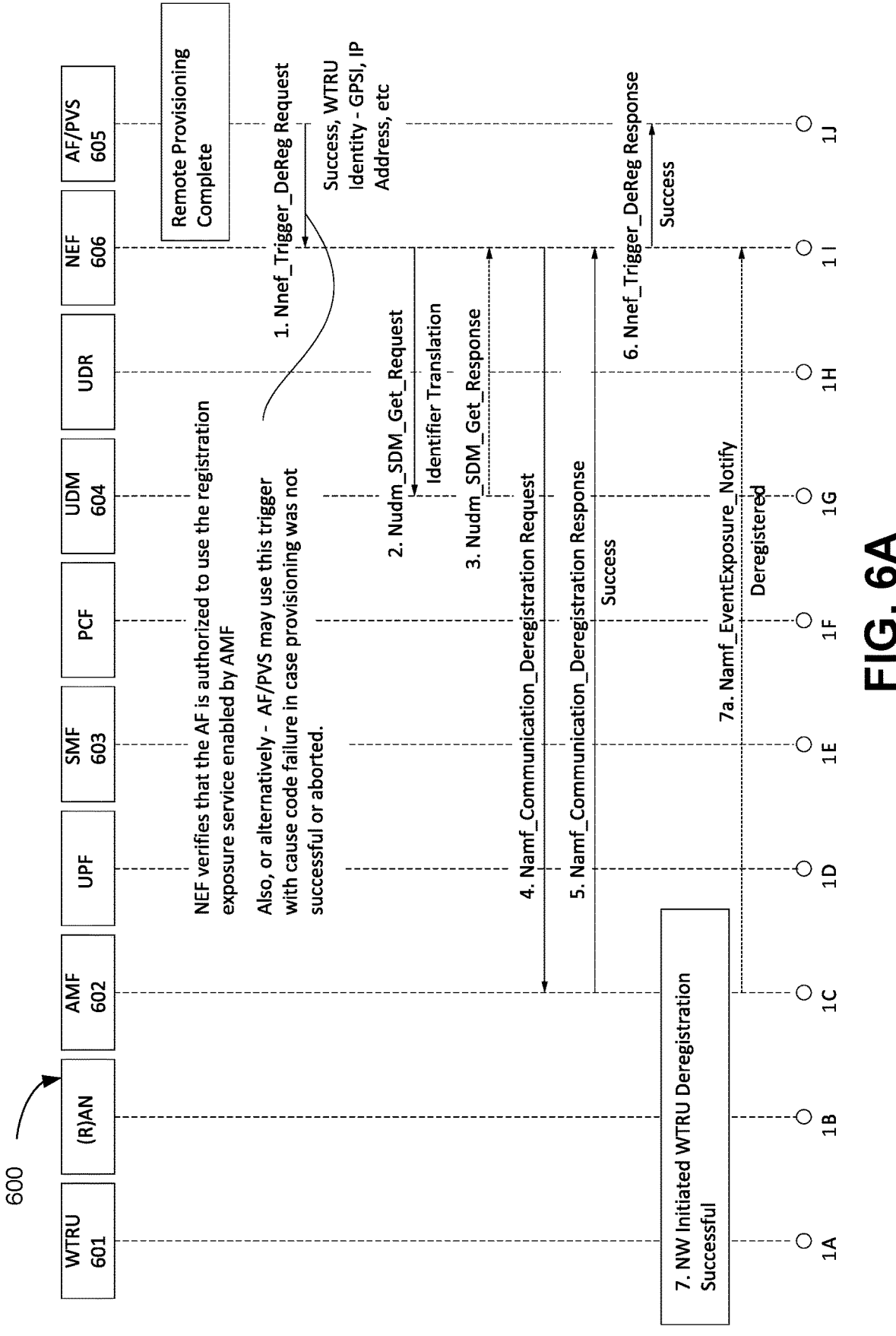
FIGS. 6A-6B illustrate an example flow for the Application Function/Provisioning Server usage of the 5G registration exposure service.
Figure 6B:
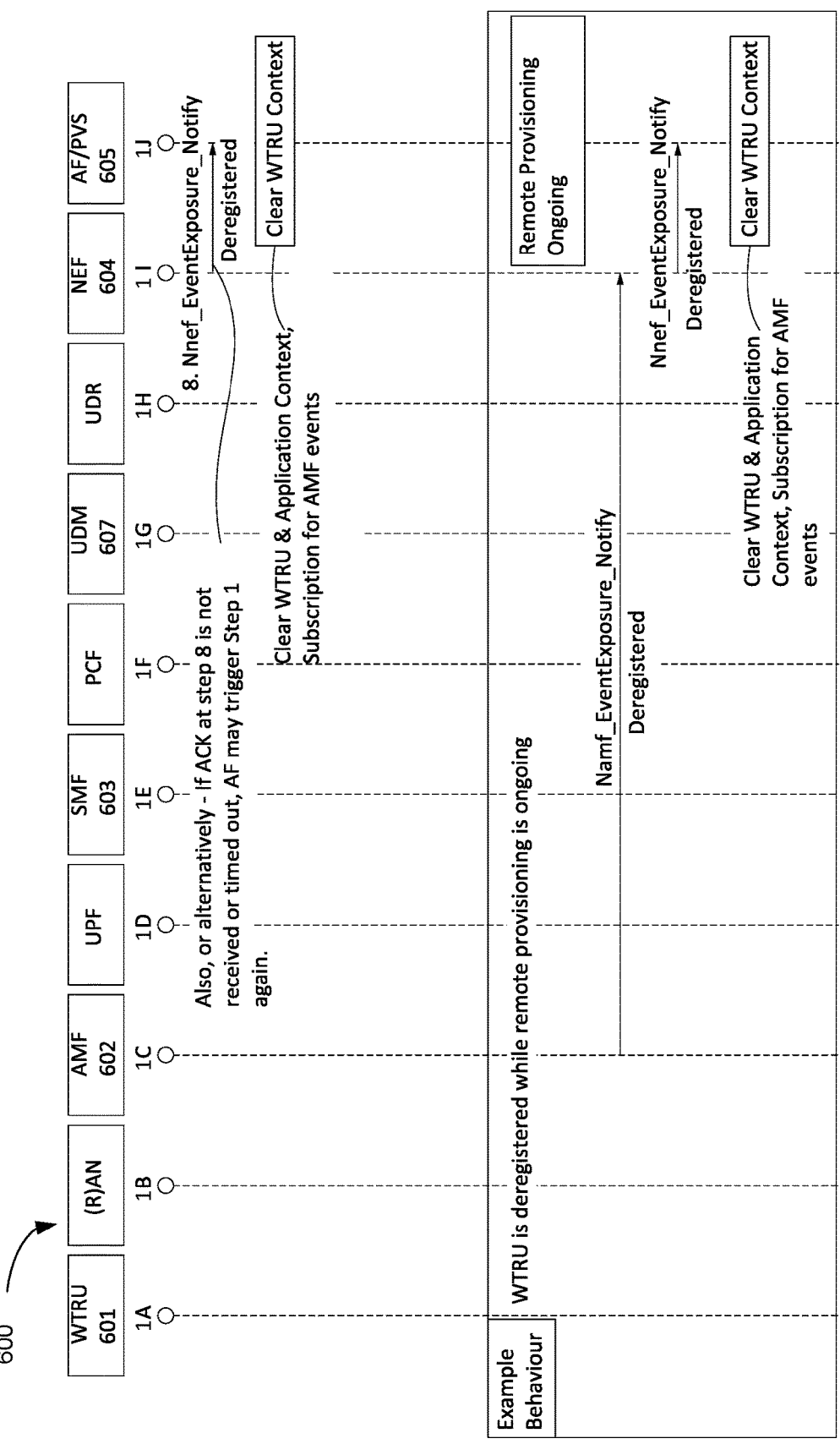

FIGS. 6A-6B illustrates an example procedure 600 associated with provisioning a WTRU 601 with credentials to access an SNPN. As shown in FIGS. 6A-6B, the procedure 600 illustrates example techniques associated with an external AF/PVS 605 of an SNPN using a registration exposure service model (e.g., such as the model 300 of FIG. 3), which may be accessed via an NEF 606. One or more of the following may apply. The WTRU 601 may register with an ONN to perform a remote provisioning procedure, e.g., over the UP. Upon successful completion of a remote provisioning (e.g., over the UP), a NEF 606 may verify that the AF/PVS 605 is authorized to use the registration exposure service enabled by AMF 602. The AF/PVS 605 may trigger the NEF 606 to notify a network node associated with the ONN (e.g., the AMF 602, SMF 603, etc.) about the successful completion of remote provisioning for the WTRU. For example, the AF/PVS 605 may trigger the NEF 606 via a Nnef_Trigger_DeReg request message that include an indication of the success provision, and/or an identifier associated with the WTRU 601). In response to being notified of the successful provisioning, the AMF 602 may deregister the WTRU 601 from the ONN. Also, or alternatively, the AF/PVS 605 may trigger to the NEF 606 to notify the network node associated with the ONN (e.g., the AMF 602, SMF 603, etc.) that the remote provisioning for the WTRU 601 was not successful.

The NEF 606 may invoke the UDM 604 (e.g., via Nudm_SDM_Get_Request message) to retrieve an identity translation for the WTRU 601 (e.g., GPSI to SUPI), and/or to determine if AF/PVS 605 is authorized to use the registration exposure service. The NEF 606 may receive a response may from the UDM 604 indicating that the AF/PVS 605 is authorized to use the registration exposure service. The NEF may invoke a Namf_Communication_Deregistration request message towards the AMF 602, which may cause the AMF 602 to trigger deregistration procedure for the WTRU 601. In response to the Namf_Communication_Deregistration request message, the AMF 602 may transmit a Namf_Communication_Deregistration response message via the NEF 606. The NEF 606 may relay information about the successful response received from the AMF 602 to the AF/PVS 605 (e.g., via Nnef_Trigger_DeReg response message).

The AMF 602 may trigger a deregistration procedure (e.g., a network initiated deregistration procedure) with the WTRU 601. After the deregistration procedure for the WTRU 601 completes, AMF 602 may, for example, notify the NEF 606 about the registration state change (e.g. the WTRU 601 is deregistered). The NEF 606 may then relay that the WTRU 601 has been deregistered to the AF/PVS 605, which may mark a successful completion of the procedure at the AF/PVS 605. For example, the AF/PVS 605 may clear the WTRU 601's context after being notified that WTRU 601 was successfully deregistered from the ONN. If, however, the NEF 606 does not relay information about the WTRU being deregistered to the AF/PVS 605 (e.g., an ACK for registration state change is not transmitted by the AF/PVS 605 within a specific time), the AF/PVS 605 may re-trigger the onboarding procedure. The AF/PVS 605 may also, or alternatively, use various means to supervise this procedure (e.g., timer or counter based).

In certain scenarios, the WTRU 601 may deregister itself from the ONN. If, for example, the WTRU 601 deregisters itself from the ONN while remote provisioning is ongoing, the AMF 602 may notify the NEF 606 about the onboarding WTRU registration state change (e.g., via Namf_EventExposure_Notify (Deregistered) message). The NEF 606 may then inform the AF/PVS 605 that the WTRU 601 has been deregistered from the ONN. As the AF/PVS 605 may not expect the WTRU 601 to deregister itself from the ONN, the AF/PVS 605 may clear the WTRU 601's context (e.g., all the WTRU 601's context).

Although features and elements are described above in particular combinations, one of ordinary skill in the art will appreciate that each feature or element can be used alone or in any combination with the other features and elements. Similarly, although the publish/subscribe model techniques described herein are provided in the context of provisioning a WTRU on a SNPN via an ONN, it should be appreciated that these techniques can be used in a variety of scenarios to connect certain function of a first network and functions of an external network. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, terminal, base station, RNC, or any host computer.

What is claimed:

1. A method for provisioning a wireless transmit receive unity (WTRU) on a non-public network (NPN), the method comprising:

receiving an indication that the WTRU is requesting to register with an onboarding network (ONN) in order to request credentials for the NPN;

transmitting an identifier associated with the WTRU to a provisioning server (PVS) associated with the NPN;

sending a request to subscribe to one or more notifications related to provisioning with the NPN;

receiving a notification that the WTRU has successfully provisioned with the NPN; and sending a de-registration indication to the WTRU in response to the received notification that the WTRU has successfully provisioned with the NPN, the de-registration indication indicating that the WTRU has been de-registered from the ONN.

2. The method of claim 1, further comprising receiving a physical data unit (PDU) session establishment request from the WTRU, the PDU session establishment request being associated with a restricted PDU session for provisioning the WTRU on the NPN.

3. The method of claim 1, wherein the identifier associated with the WTRU comprises a generic public subscription identifier.

4. The method of claim 1, further comprising receiving a registration request at a network node associated with the ONN, wherein the registration request is received from the WTRU.

5. The method of claim 4, further comprising transmitting an identifier of the network node to the PVS.

6. The method of claim 1, wherein the notification that the WTRU has successfully provisioned with the NPN is received in response to the WTRU receiving credentials for accessing the NPN.

7. The method of claim 6, further comprising initiating a selection procedure with NPN, wherein the selection procedure is initiated by the WTRU using the received credentials for accessing the NPN.

8. The method of claim 1, wherein the onboarding notification function associated with the WTRU provisioning with the NPN is provided via a network exposure function (NEF).

9. A network node comprising a processor, the processor configured to:

receive an indication that a WTRU is requesting to register with an onboarding network (ONN) in order to request credentials for an NPN;

transmit an identifier associated with the WTRU to a provisioning server (PVS) associated with the NPN;

send a request to subscribe to one or more notifications related to provisioning with the NPN;

receive a notification that the WTRU has successfully provisioned with the NPN; and sending a de-registration indication to the WTRU in response to the received notification that the WTRU has successfully provisioned with the NPN, the de-registration indication indicating that the WTRU has been de-registered from the ONN.

10. The network node of claim 9, wherein the processor is further configured to receive a physical data unit (PDU) session establishment request from the WTRU, the PDU session establishment request being associated with a restricted PDU session for provisioning the WTRU on the NPN.

11. The network node of claim 9, wherein the identifier associated with the WTRU comprises a generic public subscription identifier.

12. The network node of claim 9, wherein the processor is further configured to receive a registration request at a network node associated with the ONN, wherein the registration request is received from the WTRU.

13. The network node of claim 12, wherein the processor is further configured to transmit an identifier of the network node to the PVS.

14. The network node of claim 9, wherein the notification that the WTRU has successfully provisioned with the NPN is received in response to the WTRU receiving credentials for accessing the NPN.

15. The network node of claim 14, wherein the processor is further configured to initiate a selection procedure with NPN, wherein the selection procedure is initiated by the WTRU using the received credentials for accessing the NPN.

16. The network node of claim 9, wherein the onboarding notification function associated with the WTRU provisioning with the NPN is provided via a network exposure function (NEF).

* * * * *